F. W. MEYER.
CONTROLLING AND REGULATING APPARATUS FOR ALTERNATING CURRENT
DYNAMO ELECTRIC MACHINES.
APPLICATION FILED JAN. 21, 1918.

1,376,453.

Patented May 3, 1921.

Witnesses:
Robert H. Weir
Arthur W. Carlson

Inventor
Friedrich W. Meyer
by Edwin B. H. Tower Jr. Atty.

UNITED STATES PATENT OFFICE.

FRIEDRICH WILHELM MEYER, OF MILWAUKEE, WISCONSIN, ASSIGNOR TO THE CUTLER-HAMMER MFG. CO., OF MILWAUKEE, WISCONSIN, A CORPORATION OF WISCONSIN.

CONTROLLING AND REGULATING APPARATUS FOR ALTERNATING-CURRENT DYNAMO-ELECTRIC MACHINES.

1,376,453.  Specification of Letters Patent.  Patented May 3, 1921.

Application filed January 21, 1918. Serial No. 212,946.

*To all whom it may concern:*

Be it known that I, FRIEDRICH WILHELM MEYER, a citizen of the German Empire, residing at Milwaukee, in the county of Milwaukee and State of Wisconsin, have invented new and useful Improvements in Controlling and Regulating Apparatus for Alternating-Current Dynamo-Electric Machines, of which the following is a specification.

This invention relates to controlling and regulating apparatus for alternating current dynamo electric machines.

An alternating current machine may be regulated and controlled by varying the duration, magnitude or number of the current pulsations acting thereon. With the means ordinarily employed certain limits of deviation from the condition of practical stability are required for the proper performance of the regulating and controlling functions. Among the causes for this necessity for deviation are the electrical and mechanical inertia and self induction of the controlling apparatus and the dynamo electric machine. In overcoming these control retarding effects time and energy are consumed. The corrective influences overcoming the electrical and mechanical inertia and self induction are in turn augmented and prolonged by these forces, which tend to make the corrections excessive. The result is that the machine overruns the proper operative condition in both directions and exhibits the phenomenon known as "hunting."

The usual methods of controlling the power of such a machine necessitates the use of resistances or transformers for varying the impressed voltage and current. Such means are inefficient and necessitate the use of mechanical switches or variable taps in the power or main current leads which in operation may interrupt the current supply of the machine. Uninterrupted service under changing conditions is therefore seriously interfered with.

One of the objects of this invention is to provide improved apparatus for regulating and controlling the duration, magnitude and number of current pulsations acting on the machine.

Another object is to produce more sensitive and stable regulation and eliminate or lessen hunting.

Another object is to provide improved regulating means which will respond to slight variations in operating conditions and instantaneously produce amplified regulating effects.

Another object is to facilitate controlling the speed and torque of alternating current dynamo electric machines.

A further object is to provide apparatus whereby all or most of the regulating currents may be supplied by the line.

Other objects and advantages will appear from the following specification and claims.

Embodiments of the invention are diagrammatically illustrated in the accompanying drawings and will be herein explained as applied to the control and regulation of induction motors, but the invention is readily susceptible of other embodiments and of being adapted to control and regulate other types of alternating current dynamo electric machines.

In accordance with the embodiments as employed to regulate an induction motor, the motor is regulated primarily through the agency of an electroionic valve adapted to respond instantly under variations in the load, voltage or other conditions of the motor to affect the duration, amplitude or frequency of the current pulsations to the motor. The instantaneously applied corrective effects are multiplied or augmented to such an extent that the variations in the operation of the motor brought about by variations in load, voltage drops, etc., are checked in their incipiency and hunting is effectively lessened or prevented. The action of the electroionic valves may be readily varied at will so that the action of the motor may be controlled without danger of interrupting the current supply.

This application is a continuation in part of my copending application Serial No. 142,243, filed January 13th, 1917. The electroionic valves herein shown are of the same general nature and the characteristics of operation are the same as those shown in my copending application.

In the drawings

Figure 1:
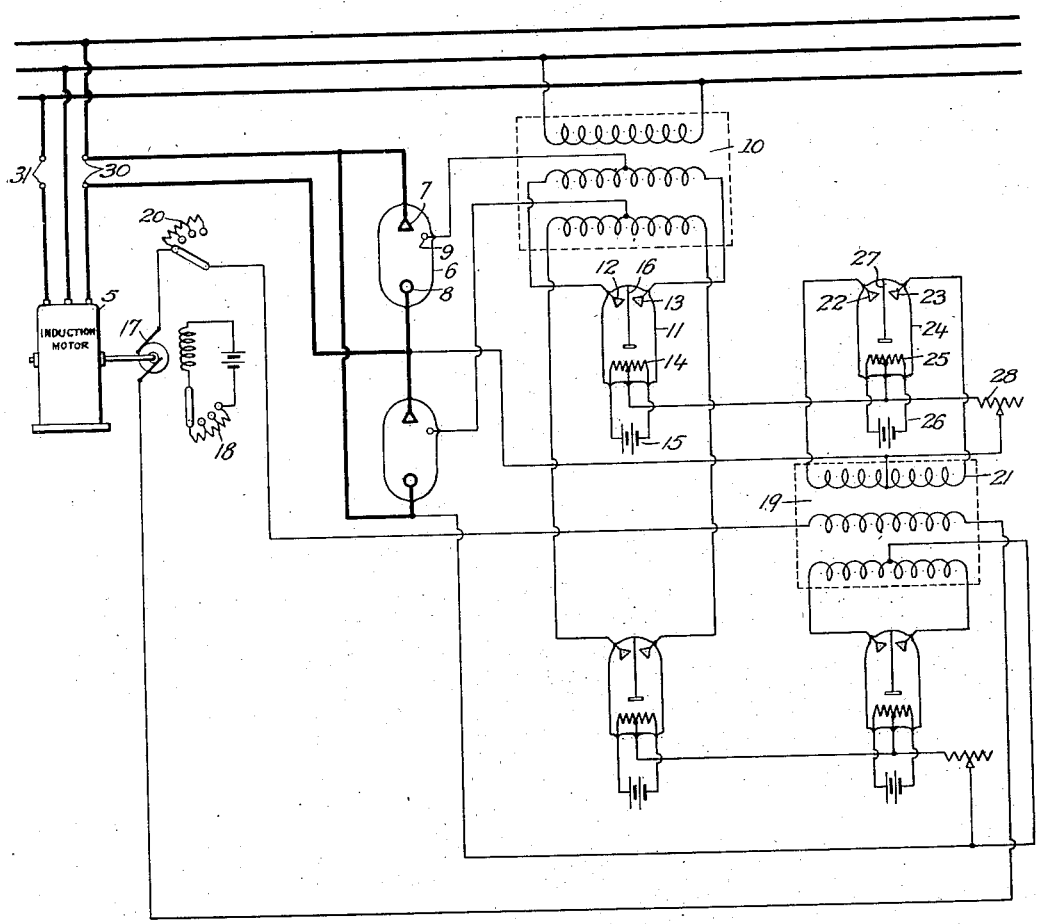
Figure 1 shows electroionic apparatus for controlling and regulating a motor, the current pulses in opposite directions being controlled independently.

Fig. 1 will first be described.

The motor illustrated is of the three phase type and may have either a squirrel cage secondary or a wound secondary with the slip rings connected together. For the purpose of simplicity only the regulating apparatus employed for one circuit is represented, but it will be understood that similar apparatus will be provided for the second circuit. The third circuit, being the common return of the system, requires no regulating apparatus. Apparatus for regulating the pulses in both directions is illustrated, but since they are precisely the same only one need be described.

The main or working current pulsations from the source, in one direction, pass to a motor 5 through a main electroionic valve 6. This valve is of the arc discharge type and the operation of the motor may be regulated and controlled by varying the time, duration and character of the discharge. The valve has an anode 7, a cathode 8 and an auxiliary or ignition anode 9. The current pulsations in one direction from one line circuit to the motor are supplied through the arc discharge between anode 7 and cathode 8 and this discharge is under the influence of and controlled by the auxiliary discharge between ignition anode 9 and cathode 8. Thus by regulating and controlling the auxiliary discharge the current pulsations to the motor may be regulated and controlled.

Unidirectional pulsatory voltages and currents are impressed between auxiliary anode 9 and cathode 8 through rectifying apparatus associated with the supply mains. This apparatus comprises a transformer 10, whose primary is connected across one of the line phases, and a rectifier 11. Rectifier 11 has two anodes 12 and 13 and a cathode 14. The two anodes 12 and 13 are connected to the outside terminals of one of the secondary windings of transformer 10, the middle of this secondary being connected to the auxiliary anode 9. The cathode 14 is heated by current from a battery 15 and the discharge paths between the cathode and anodes 12 and 13 are separated by a partition 16.

The unidirectional discharges through rectifier 11 and consequently the discharges of the main valve 6 are automatically regulated by the variations in motor speed brought about by changes in load, etc. This is accomplished through a small alternating current generator or tachometer machine 17 which is driven by and therefore simulates the operating conditions of the motor 5. Tachometer 17 has a separately excited field which may be varied at will by a rheostat 18. The armature of tachometer 17 is connected to the primary winding of a transformer 19 through an adjustable resistance 20.

The outside terminals of a secondary winding 21 of transformer 19 are connected respectively to a pair of anodes 22 and 23 of a rectifier 24. Rectifier 24 has a cathode 25 heated by current from a battery 26 and the discharge paths are separated by a suitable partition 27. An adjustable non-inductive resistance 28 is located in the circuit between the middle of cathode 14 of rectifier 11 and cathode 8 of the main electroionic valve 6. Taps are taken from this circuit to the middle of cathode 25 of rectifier 24 and secondary 21 of transformer 19.

The current from the tachometer 17 induces current in secondary 21 which is rectified by the rectifier 24. This rectified current passing through resistance 28 causes a certain drop of potential across that resistance which affects the current through rectifier 11 whose circuit also includes resistance 28. The currents flowing through rectifier 24 can not traverse rectifier 11 because current can flow therein only from the anodes to the cathode, but rectifier 24 can nevertheless control the action of rectifier 11 by controlling the current flowing through resistance 28.

When the tachometer speed, following exactly the speed of the motor, varies, the voltage and current induced in secondary 21 of transformer 19 varies, thus altering the discharge through electronic rectifier 24. These variations vary the current flowing through the circuit including anodes 22 and 23, cathode 25 and resistance 28. These current changes alter the voltage and current flowing in the circuit including supplementary anode 9 of valve 6, a secondary of transformer 10, anodes 12 and 13, cathode 14, resistance 28, and cathode 8 of valve 6. The ignition voltages of valve 6 are thus varied to control the action of the valve.

If the motor speed decreases the tachometer speed likewise decreases, the drop in potential across resistance 28 decreases and more voltage is impressed between ignition anode 9 and cathode 8 of valve 6. The ignition of valve 6 is thereby advanced and its discharge path is affected to cause the pulses in one direction to the motor to be advanced and a higher potential to be impressed upon the motor. An increase in motor speed results in the opposite effect.

The apparatus for controlling the pulsations in the reverse direction is the same and operates in precisely the manner just described. The apparatus for one motor lead is connected between terminals 30, similar apparatus for the other lead being connected between terminals 31. The one tachometer can control all of the apparatus.

By retarding the time of the creation of critical voltages between the supplementary or ignition anodes and the cathodes of the main electroionic valves, the duration and voltage of the alternating current pulses supplied to the motor may be decreased, in fact the production of critical ignition voltages may be so retarded that entire pulsations may be eliminated and the frequency of the alternating current impressed upon the motor may thus be decreased. The voltage impressed between the auxiliary or ignition anodes and the cathodes of the main electroionic valves, in addition to thus altering the time of ignition, may affect the character of the discharge between the main anodes and cathodes and by these combined effects, the duration and the magnitude or voltage, and the period or frequency or any one or combination of these factors of the alternating current pulsations supplied to the motor may be readily and instantaneously varied to provide instantaneous and magnified corrective effects upon the operation of the motor. These corrective effects being started and controlled by forces which are directly responsive to speed variations of the motor and acting through apparatus which is free from mechanical inertia and self induction, act sharply and instantaneously to compensate for variations in motor speed due to variations in load, etc., and provide exceedingly stable and reliable regulation and materially lessen or eliminate hunting and oscillating tendencies.

The speed and torque of the motor may be varied at will by altering the excitation of the tachometer field by rheostat 18 or by adjusting rheostat 20. Usually the best results are obtained by adjusting the field and having the resistance inserted through rheostat 20 as low as practicable because high resistances in the regulating circuits render them less sensitive.

The hot cathode rectifiers insure that the auxiliary arcs in the main electroionic valve 6 are not continued and that the currents in those arcs do not become excessive because such rectifiers act to limit the current flowing therethrough. The amount of current flowing through the hot cathode rectifiers depends upon the heated condition of the cathode and if it is found that the auxiliary discharges of the main electroionic valves tend to persist or an excess of current tends to flow therethrough, the heating current to the cathodes can be decreased.

It will be noted that in the main the controlling and regulating, as well as the controlled, current is derived from the line and consequently whatever auxiliary batteries or other primary sources of current are required may be very small. Also the motor speed and torque can be controlled by varying the position of switches or contacts which have no direct connection with the current supply to the motor, which thus materially lessens the chances of interruptions of service.

Figure 2:
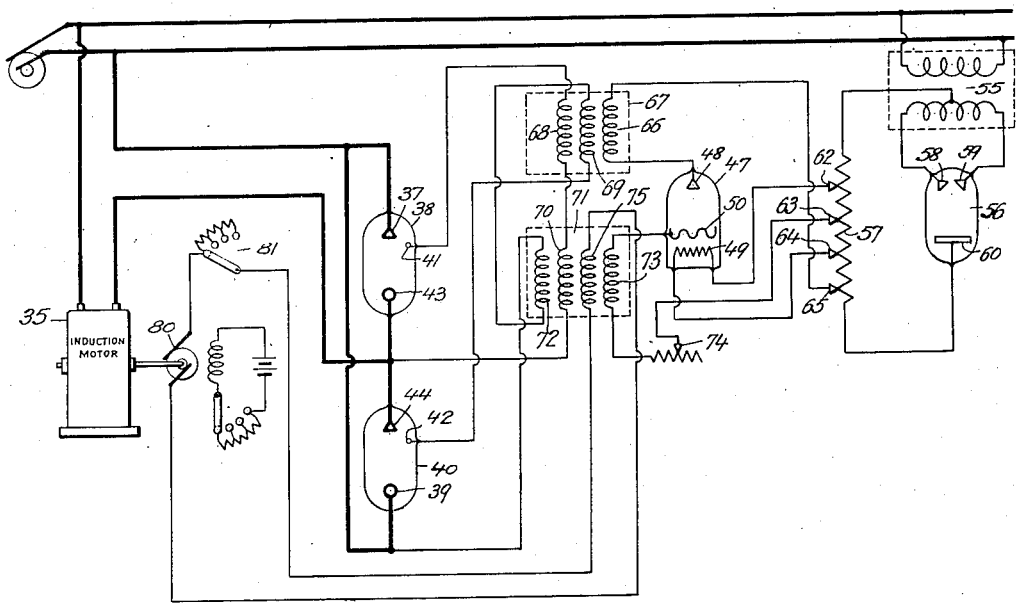
Fig. 2 shows apparatus for regulating a motor wherein current pulses in opposite directions are controlled by combined electroionic effects through a single electroionic valve or relay.

Fig. 2 shows controlling and regulating apparatus for a single phase induction motor, the main electroionic valves for the pulses in each direction being controlled by a single electronic relay or other electroionic relay of sufficiently low pressure. In one of the supply leads for a motor 35 there is connected in parallel an anode 37 of an electroionic valve 38 and a cathode 39 of an electroionic valve 40. Electroionic valves 38 and 40 are of the arc discharge type and are supplied respectively with auxiliary or ignition anodes 41 and 42. Valve 38 has a cathode 43 and valve 40 has an anode 44. Cathode 43 and anode 44 are connected to one terminal of the motor, the other terminal being connected directly to the line. Current pulsations in one direction are controlled through the main electroionic valve 38 while the pulsations in the reverse direction are controlled through valve 40.

The main electroionic valves 38 and 40 may control the duration, amplitude and frequency, or any one or combination of these factors of the current flowing to the motor, as will be hereinafter described, and are in turn sharply controlled by an electroionic valve or relay 47. Relay 47 has an anode 48, a cathode 49 and an auxiliary anode 50 which may take the form of a grid. The cathode 49 is heated by unidirectional pulsatory current derived from the line by current rectifying apparatus comprising a transformer 55, an electroionic rectifier 56 and a resistance 57. The electroionic rectifier 56 has two anodes 58 and 59, connected to the two outside terminals of the secondary winding of transformer 55, and a cathode 60. Cathode 60 and the middle of the secondary of transformer 55 are connected to the terminals of resistance 57.

Resistance 57 is provided with a plurality of adjustable contacts 62, 63, 64 and 65. Contacts 62 and 64 are connected to the outside terminals of cathode 49 of electroionic relay 47. Contact 65 is connected to anode 48 of relay 47 through the primary winding 66 of a transformer 67.

Transformer 67 is provided with two secondary windings 68 and 69 which are connected respectively to the auxiliary or ignition anodes 41 and 42 of electroionic valves 38 and 40. Secondary winding 68 is also connected to a point between cathode 43 and anode 44 of valves 38 and 40 through a secondary winding 70 of a transformer 71. Transformer 71 also has a secondary winding 72 through which secondary winding 69 of transformer 67 is connected to cathode 39 of electroionic valve 40. A third secondary winding 73 of transformer 71 is connected to the auxiliary anode 50 of relay 47, and the contact 63 of resistance 57 through an adjustable resistance 74. Transformer 71 has a primary winding 75 connected to the opposite terminals of an alternating current tachometer machine 80 through an adjustable resistance 81.

Tachometer machine 80 is carried by the shaft of motor 35 and is provided with an adjustable separately excited field. This machine being of the alternating current type produces through the agency of transformer 71 an alternating voltage, which, superimposed upon the unidirectional pulsations from rectifier 56 and resistance 57, impresses a pulsatory unidirectional supplementary voltage between auxiliary anode 50 and cathode 49 of relay 47. This supplementary voltage is superimposed upon the unidirectional pulsatory voltages impressed between anode 48 and cathode 49 by the rectifying apparatus previously described and acts to vary the voltage between the main anode and cathode as the tachometer varies in speed. The relay 47 may thus be controlled by all of the pulses of the alternating current supplied through the tachometer regardless of the rectifying effect of the heated cathode 49.

Changes in the speed of the tachometer thus instantaneously produce great changes in the current flowing through the relay 47. Through the action of transformer 67 these current changes produce corresponding effects upon the voltage between the ignition anodes and cathodes of electroionic valves 38 and 40. The variations in speed of the tachometer also have a direct influence on the voltage between the ignition anodes and cathodes of valves 38 and 40 through the action of the primary and the secondaries 70 and 72 of transformer 71. Since there is no relay action upon these effects, however, this influence is small. The influence of the tachometer upon the supplemental voltage of the relay 47, however, produces greatly magnified effects upon the ignition voltages impressed upon valves 38 and 40. The influence of transformers 67 and 71 upon the auxiliary discharges of the main electroionic valves 38 and 40 are opposed to each other, the influence of transformer 71 normally predominating. The effect upon the auxiliary discharges is therefore the difference between the influences of the two transformers.

The changes in the ignition voltage in the electroionic valves 38 and 40 can vary the time, character and duration of the ignition, and thus may control the amplitude, duration and frequency of the alternating current pulsations to the motor. The initial condition can be readily adjusted and altered by changing the resistance in the tachometer field, resistance 81 in the circuit of the tachometer and primary 75 of transformer 71, resistance 74 in the circuit of the auxiliary anode and the transformer secondary 73, or by adjusting the contacts 63 and 65 in the circuit of auxiliary anode 50 and anode 48 respectively.

If the motor, due to changes in load, or other conditions, tends to decrease in speed the tachometer, simulating the operative condition of the motor, instantaneously decreases in speed and supplies current at lower voltage and frequency to the transformer primary 75. Consequently less voltage is induced in secondary 73 decreasing the supplemental voltage between supplementary anode 50 and cathode 49. This increases the voltage consumed in relay 47 and as a result lower voltages are impressed on the primary 66 of transformer 67. The resultant effect of transformer 67 and transformer 71, the effects of the latter as previously pointed out not being materially diminished by the change in tachometer speed, is therefore instantaneously and greatly increased and greater voltages are impressed between the ignition anodes and the cathodes of the main electroionic valves 38 and 40. The ignition on each pulsation of alternating current supplied by the electroionic valves therefore takes place earlier in the cycle and the arc is otherwise affected so that higher voltage is supplied to the motor. On the other hand an increase in the speed of the motor increases the impressed voltage between auxiliary anode 50 and cathode 49 of relay 47, causing a diminished consumption of potential in the relay. More voltage is thereupon impressed upon transformer primary winding 66 and consequently the difference in the opposing effects of transformers 67 and 71 is decreased and less voltage is impressed between the ignition anodes and the cathodes of main electroionic valves 38 and 40. Each pulse to the motor is thus retarded and the arc is affected so that less voltage is supplied to the motor. As in the apparatus first described the time of ignition may be so varied as to actually vary the frequency of the current supplied to the motor.

By means of the apparatus just described the time, duration and frequency of the current supplied to the motor is varied to regulate the motor speed under variations in load, etc., the corrective influences are brought about by speed changes of the motor, are greatly magnified and being practically instantaneously applied exceedingly stable regulation is obtained.

Figure 3:
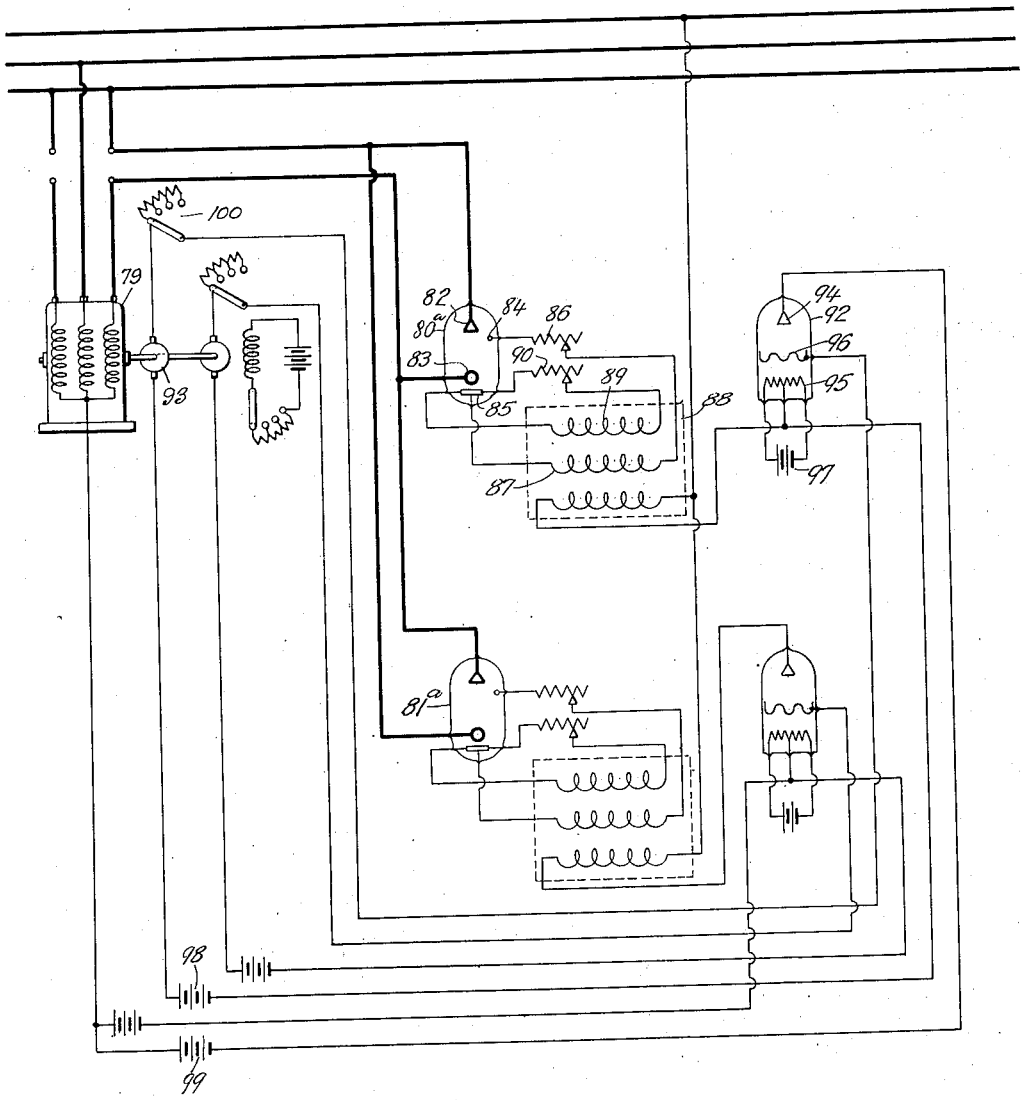
Fig. 3 shows a modification wherein combined electroionic effects are obtained and utilized for control and regulation.

Fig. 3 shows apparatus employing electroionic controlling and regulating valves which combine in one vessel, the principles of arc ignition and thermal control electronic relays or other electroionic relays of sufficiently low pressure being utilized to assist in the magnifying of the corrective effects.

A motor 79 having a Y. or star wound primary and with squirrel cage or short circuited secondary is controlled by two electronic valves 80$^a$ and 81$^a$ in each of its outside circuits. Only the apparatus in one circuit is shown, the apparatus for the other circuit being similar thereto. In this case also no apparatus is required in the neutral lead. Valve 80$^a$ controls the pulses in one direction and valve 81$^a$ controls the pulses in the reverse direction and since they are similar and function in the same way only one need be described.

Electroionic valve 80$^a$ has a main anode 82 and a main cathode 83. It is also provided with an auxiliary or ignition anode 84 and an auxiliary cathode 85. The line to the motor is connected between main anode 82 and main cathode 83. The auxiliary anode 84 is connected in a circuit including an adjustable resistance 86, a secondary winding 87 of transformer 88 and auxiliary cathode 85. Cathode 85 is heated by current from a secondary winding 89 of transformer 88 and the heat may be varied through an adjustable resistance 90.

Both the supplementary ignition voltage and the heating of the cathode of valve 80$^a$ is controlled by an electroionic relay 92. Relay 92 is controlled by a direct current tachometer machine 93.

Relay 92 has an anode 94, a cathode 95 and an auxiliary anode 96. Cathode 95 is heated by current from a battery 97 and is connected to one terminal of the primary of transformer 88 and to the armature of tachometer 93. The other terminal of the transformer primary is connected in circuit to one of the main line leads. A battery 98 placed between the cathode 95 and the tachometer, opposes the voltage of the tachometer and normally predominates. The anode 94 is connected with the neutral point of the motor primary windings through a battery 99. The auxiliary anode 96 is connected through an adjustable resistance 100 to the tachometer armature.

Changes in the tachometer speed brought about by changes in motor speed varies the voltage impressed between auxiliary anode 96 and cathode 95 of relay 92. This varies the voltage consumed in relay 92 which varies the current flowing in the circuit from the line through the motor primary, battery 99, anode 94 and cathode 95 of relay 92, and the primary of transformer 88 to line. The variations in the current flowing in this circuit changes the voltages induced in the two secondaries of transformer 88. The changes in the voltages induced in secondary 89 change the current heating cathode 85 of valve 80$^a$ and the changes in the voltages induced in secondary 87 change the voltage impressed between supplementary anode 84 and cathode 85. Both the changes in the heating of the cathode and the supplemental voltages affect the operation of valve 80$^a$ by influencing the discharge between main anode 82 and main cathode 83.

If the motor speed decreases the tachometer simulating the action thereof produces less voltage. The difference in voltage between the tachometer and battery 98 thus increases and a greater voltage is impressed between the auxiliary anode 96 and cathode 95 of relay 92. The voltage consumed in relay 92 thereupon decreases resulting in an increased voltage upon the terminals of the primary winding of transformer 88. This results in a greater supply of heating current to the cathode 85 of valve 80$^a$ and a higher voltage between supplementary or ignition anode 84 and cathode 85. The main discharge in valve 80$^a$ is thereby affected and the pulses are started sooner and a greater voltage is thus impressed on the motor and its speed is increased. The effects of the speed variation of the tachometer are greatly magnified by the relay 92 and the effects of the relay are in turn greatly magnified by the combined actions produced upon valve 80$^a$. The corrections are thus instantaneously applied and are greatly magnified. The result is that the regulation is exceedingly rapid and stable. An increase in motor speed has the opposite effect and, as pointed out for the other arrangements shown, the time of the starting of the pulses may be so varied as to vary the frequency of the voltages impressed on the motor.

The pulsations in the reverse direction are controlled in a similar manner by valve 81$^a$ which is affected by a relay and tachometer as just described. Each relay may be provided with a complete tachometer, or if desired, only the commutators, windings and brushes may be independent. The connections for the anode and cathode of the relay of valve 81 are of course reversed because of the reversal of the pulsations which they are to control.

In all cases the current supplied by the tachometer may be of such minute quantities that the effects of self induction caused thereby may be entirely disregarded. The tachometer has been adopted merely as one way to obtain a variable voltage under variations in motor speed.

Although the regulating apparatus has been particularly described as adapted to regulate the motor to maintain constant speed, it is capable of being adapted to regulate the motor to obtain other results.

What I claim is:

1. Controlling and regulating apparatus for alternating current dynamo electric machines, comprising an electroionic valve for controlling and regulating the duration, magnitude or frequency of the current supplied to the machine, means responsive to speed variations of the machine, and controlling devices for the electroionic valve for controlling the discharge characteristics thereof coincidently with speed variations of the machine, whereby substantially constant speed of the machine is maintained.

2. Controlling and regulating apparatus for alternating current dynamo electric machines whose operation may be varied by varying the duration, magnitude or frequency of the current impulses supplied thereto comprising an electroionic valve capable of varying at least one of the controlling factors of the machine, means simulating the operating conditions of the machine, and apparatus simultaneously responsive to variations in the operation of said means for controlling said electroionic valve whereby variations in the operation of the machine simultaneously varies at least one of the controlling factors thereof.

3. Controlling and regulating apparatus for alternating current dynamo electric machines comprising, an electroionic valve for controlling and regulating the duration, magnitude or frequency of the current supplied to the machine, means directly under the influence of the line current for exerting an influence upon the operation of said valve, and means under the control of and instantaneously responsive to variations in the operation of the machine for also exerting an influence upon the operation of said valve.

4. Controlling and regulating apparatus for alternating current dynamo electric machines comprising a main electroionic valve, an electroionic relay, means instantaneously responsive to variations in the operation of the machine for controlling the action of said relay, and inductive means controlled by said relay and controlling said valve to vary the duration, magnitude or frequency of the current pulses supplied to the machine by said valve.

5. Apparatus for regulating and controlling the operation of an alternating current dynamo electric machine comprising, an electroionic valve adapted to be placed in the supply circuit to the machine, an electroionic relay for controlling the action of said valve whereby the duration, magnitude or frequency of the current pulsations to the machine may be varied, means simulating the operation of the machine for controlling said relay, and means supplied with current from the line for furnishing the current by which said relay controls said valve.

6. In combination with an alternating current dynamo electric machine, of a source of alternating current therefor, an electroionic valve located between the source and machine, an electroionic relay for effecting the operation of said valve to supply current to the machine, a transformer controlled by said relay and controlling said valve, and a tachometer machine simulating the operation of the machine for controlling said relay.

7. In combination with an alternating current, dynamo electric machine which may be controlled by varying the duration, magnitude or frequency of the current pulsations supplied thereto, of an electroionic relay responsive to speed variations of the machine, a transformer affected by said relay, and an electroionic valve influenced by said transformer for varying at least one of the controlling factors of the machine.

8. Controlling and regulating apparatus for dynamo electric machine comprising an electroionic valve for controlling and regulating the duration, magnitude or frequency of the current supplied to the machine, means responsive to speed variations of the machine, and an electroionic relay controlled by the speed responsive means for varying coincidently with such speed variations at least one of the controlling factors.

9. In combination with a dynamo electric machine influenced by changing load and supply conditions and which may be controlled by varying coincidently with the varying conditions the frequency, amplitude or duration of current impulses acting thereon, an electroionic valve for controlling at least one of these factors, and means coincidently responsive to the changing conditions and controlling the valve.

10. A regulator for a dynamo electric machine which may be controlled by varying the frequency, amplitude or duration of current impulses acting thereon, having an electroionic valve for controlling at least one of these factors substantially simultaneously with the varying operating conditions, and means responding substantially simultaneously to the varying operating conditions of the machine and controlling the valve.

11. A regulator for a dynamo electric machine which may be controlled by varying the frequency, amplitude or duration of current impulses acting thereon and subject to changing load and power conditions, having an electroionic valve whose action is substantially coincidently controlled by and in accordance with the varying conditions and producing corrective influences for controlling at least one of the controlling factors.

In witness whereof, I have hereunto subscribed my name.

FRIEDRICH WILHELM MEYER.